US011960455B2

(12) United States Patent
Yin et al.

(10) Patent No.: US 11,960,455 B2
(45) Date of Patent: Apr. 16, 2024

(54) METHOD AND APPARATUS FOR BUILDING DATABASE FOR RETRIEVAL, DEVICE AND STORAGE MEDIUM

(71) Applicant: Baidu Online Network Technology (Beijing) Co., Ltd., Beijing (CN)

(72) Inventors: Jie Yin, Beijing (CN); Ben Huang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 7 days.

(21) Appl. No.: 17/969,369

(22) Filed: Oct. 19, 2022

(65) Prior Publication Data
US 2023/0041611 A1 Feb. 9, 2023

Related U.S. Application Data

(63) Continuation of application No. PCT/CN2022/081154, filed on Mar. 16, 2022.

(30) Foreign Application Priority Data

Aug. 16, 2021 (CN) .......................... 202110937110.0

(51) Int. Cl.
*G06F 16/21* (2019.01)
*G06F 18/23* (2023.01)

(52) U.S. Cl.
CPC .............. *G06F 16/21* (2019.01); *G06F 18/23* (2023.01)

(58) Field of Classification Search
CPC .. G06F 18/213; G06F 18/24137; G06F 17/16; G06F 16/951; G06F 18/23;
(Continued)

(56) References Cited

U.S. PATENT DOCUMENTS

2018/0101570 A1\* 4/2018 Kumar .............. G06F 18/23213
2020/0278953 A1\* 9/2020 Yang ..................... G06F 16/245

FOREIGN PATENT DOCUMENTS

CN 107943938 A 4/2018
CN 107944046 A 4/2018
(Continued)

OTHER PUBLICATIONS

International Search Report for PCT/CN2022/081154, dated Jun. 2, 2022, 4 pages.
(Continued)

*Primary Examiner* — Hau H Hoang
(74) *Attorney, Agent, or Firm* — Seed IP Law Group LLP

(57) ABSTRACT

The present disclosure provides a method and apparatus for building a database for retrieval. An implementation of the method comprises: acquiring a data set, and dividing the data set into a first data set and a second data set; clustering the data in the first data set, to obtain at least one first-level cluster center; clustering the data in the first data set based on the first-level cluster center, to obtain corresponding at least one second-level cluster center; obtaining a codebook corresponding to the first data set based on residuals between the data in the first data set and the first-level cluster center and residuals between the data in the first data set and the second-level cluster center; and training the second data set based on the codebook corresponding to the first data set, to obtain a codebook corresponding to the data set.

20 Claims, 6 Drawing Sheets

(58) Field of Classification Search
CPC ........ G06F 18/22; G06F 16/285; G06F 18/24; G06F 16/24; G06F 16/9538; G06F 16/245; G06F 18/2431; G06F 18/24323; G06F 16/22; G06F 18/231; G06F 16/35; G06F 16/906
See application file for complete search history.

(56) References Cited

FOREIGN PATENT DOCUMENTS

| CN | 109446408 A | 3/2019 |
|---|---|---|
| CN | 110134804 A | 8/2019 |
| CN | 110168525 A | 8/2019 |
| CN | 110609916 A | 12/2019 |
| CN | 110825894 A | 2/2020 |
| CN | 111143597 A | 5/2020 |
| CN | 111444363 A | 7/2020 |
| CN | 113159095 A | 7/2021 |
| CN | 113239225 A | 8/2021 |
| CN | 113656373 A | 11/2021 |
| JP | 2011-128773 A | 6/2011 |
| JP | 2011-257970 A | 12/2011 |
| JP | 2018-55618 A | 4/2018 |

OTHER PUBLICATIONS

Jégou et al., "Product Quantization for Nearest Neighbor Search," IEEE Transactions on Pattern Analysis and Machine Intelligence, vol. 33, No. 1, Jan. 2011, 12 pages.

Wikipedia, The Free Encyclopedia, "Training, validation, and test data sets," downloaded Oct. 27, 2023, 5 pages.

Anqin, "Detailed explanation of the key technologies of Baidu Rich Media Retiieval and Compatison System," with English abstract, May 12, 2021, 11 pages.

* cited by examiner

METHOD AND APPARATUS FOR BUILDING DATABASE FOR RETRIEVAL, DEVICE AND STORAGE MEDIUM

CROSS-REFERENCE TO RELATED APPLICATION

This patent application is a continuation application of International Application No. PCT/CN2022/081154, filed on Mar. 16, 2022, which claims the priority from Chinese Patent Application No. 202110937110.0, filed on Aug. 16, 2021. Both of the aforementioned applications are hereby incorporated by reference in their entireties.

TECHNICAL FIELD

The present disclosure relates to the field of artificial intelligence technology, particularly to the fields of intelligent recommendation and deep learning technologies, and more particularly to a method and apparatus for building a database for retrieval, a device and a storage medium.

BACKGROUND

With the wide application of CNNs (convolutional neural networks), the basic retrieval technology ANN (approximate nearest neighbor) applied to the features of the CNNs has also been developed rapidly. For large-scale data sets, the current mainstream retrieval algorithms in the industry include an HNSW (Hierarchical Navigable Small World) algorithm, an IVF (Inverted File System) algorithm, and the like. However, for the HNSW algorithm, the amount of calculation is large, resulting in a large demand for memory. Moreover, for the IVF algorithm, the number of cluster centers therein is large, resulting in a large number of iterations, and thus, the overall amount of calculation increases exponentially.

SUMMARY

The present disclosure provides a method and apparatus for building a database for retrieval, a device and a storage medium.

In a first aspect, some embodiments of the present disclosure provide a method for building a database for retrieval. The method includes: acquiring a data set, and dividing the data set into a first data set and a second data set, wherein an amount of data in first data set is less than an amount of data in second data set; clustering the data in the first data set, to obtain at least one first-level cluster center; clustering the data in the first data set based on the first-level cluster center, to obtain corresponding at least one second-level cluster center; obtaining a codebook corresponding to the first data set based on residuals between the data in the first data set and the first-level cluster center and residuals between the data in the first data set and the second-level cluster center; and training the second data set based on the codebook corresponding to the first data set, to obtain a codebook corresponding to the data set.

In a second aspect, some embodiments of the present disclosure provide a method for performing a retrieval. The method includes: acquiring to-be-retrieved data; calculating distances between the to-be-retrieved data and first-level cluster centers in a database for retrieval, to obtain a third preset number of first-level cluster centers satisfying a preset condition, the database for retrieval being obtained through the method described in any one of the implementations in the first aspect; calculating distances between the to-be-retrieved data and second-level cluster centers under each first-level cluster center in the third preset number of first-level cluster centers, to obtain a fourth preset number of second-level cluster centers satisfying a preset condition; acquiring, based on the codebook corresponding to the data set in the database for retrieval, pieces of sample data corresponding to each second-level cluster center in the fourth preset number of second-level cluster centers in sequence; and calculating distances from the to-be-retrieved data to the pieces of sample data, and returning a fifth preset number of pieces of sample data based on results of the calculating.

In a third aspect, some embodiments of the present disclosure provide an apparatus for building a database for retrieval. The apparatus includes: a first acquiring module, configured to acquire a data set, and divide the data set into a first data set and a second data set, wherein an amount of data in first data set is less than an amount of data in second data set; a first clustering module, configured to cluster the data in the first data set to obtain at least one first-level cluster center; a second clustering module, configured to cluster the data in the first data set based on the first-level cluster center to obtain corresponding at least one second-level cluster center; an obtaining module, configured to obtain a codebook corresponding to the first data set based on residuals between the data in the first data set and the first-level cluster center and residuals between the data in the first data set and the second-level cluster center; and a training module, configured to train the second data set based on the codebook corresponding to the first data set to obtain a codebook corresponding to the data set.

In a fourth aspect, some embodiments of the present disclosure provide an apparatus for performing a retrieval. The apparatus includes: a second acquiring module, configured to acquire to-be-retrieved data; a first calculating module, configured to calculate distances between the to-be-retrieved data and first-level cluster centers in a database for retrieval, to obtain a third preset number of first-level cluster centers satisfying a preset condition, the database for retrieval being obtained through the method according to any one of the implementations described in the first aspect; a second calculating module, configured to calculate distances between the to-be-retrieved data and second-level cluster centers under each first-level cluster center in the third preset number of first-level cluster centers, to obtain a fourth preset number of second-level cluster centers satisfying a preset condition; a third acquiring module, configured to acquire, based on the codebook corresponding to the data set in the database for retrieval, pieces of sample data corresponding to each second-level cluster center in the fourth preset number of second-level cluster centers in sequence; and a third calculating module, configured to calculate distances from the to-be-retrieved data to the pieces of sample data, and returning a fifth preset number of pieces of sample data based on results of the calculating.

In a fifth aspect, some embodiments of the present disclosure provide an electronic device. The electronic device includes: at least one processor; and a storage device, in communication with the at least one processor, where the storage device stores instructions that, when executed by the at least one processor, cause the at least one processor to perform the method according to any one of the implementations described in the first aspect.

In a sixth aspect, some embodiments of the present disclosure provide a non-transitory computer readable storage medium, storing computer instructions that, when executed by a computer, cause the computer to perform the method according to any one of the implementations described in the first aspect.

It should be understood that the content described in this part is not intended to identify key or important features of embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that embodiments in the present disclosure and the features in the embodiments may be combined with each other on a non-conflict basis. Embodiments of the present disclosure will be described below in detail with reference to the accompanying drawings.

Figure 1:
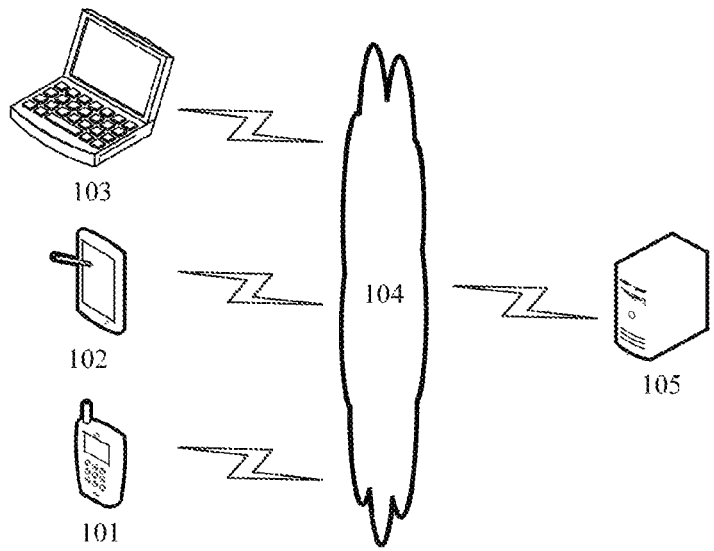
FIG. 1 illustrates an example system architecture in which embodiments of the present disclosure may be applied.

FIG. 1 illustrates an exemplary system architecture 100 in which a method for building a database for retrieval or an apparatus for building a database for retrieval according to embodiments of the present disclosure may be applied.

As shown in FIG. 1, the system architecture 100 may include terminal device(s) 101, 102, 103, a network 104 and a server 105. The network 104 serves as a medium providing a communication link between the terminal device(s) 101, 102, 103 and the server 105. The network 104 may include various types of connections, for example, wired or wireless communication links, or optical fiber cables.

A user may use the terminal device(s) 101, 102, 103 to interact with the server 105 via the network 104, to receive or send a message, etc. Various client applications may be installed on the terminal device(s) 101, 102, 103.

The terminal device(s) 101, 102, 103 may be hardware or software. When being the hardware, the terminal device(s) 101, 102, 103 may be various electronic devices, the electronic devices including, but not limited to, a smartphone, a tablet computer, a laptop portable computer, a desktop computer, and the like. When being the software, the terminal device(s) 101, 102, 103 may be installed in the above electronic devices. The terminal device(s) 101, 102, 103 may be implemented as a plurality of pieces of software or a plurality of software modules, or may be implemented as a single piece of software or a single software module, which will not be specifically limited here.

The server 105 may provide various services. For example, the server 105 may analyze and process the data set acquired from the terminal device(s) 101, 102, 103, and generate a processing result (e.g., a codebook corresponding to the data set).

It should be noted that the server 105 may be hardware or software. When being the hardware, the server 105 may be implemented as a distributed server cluster composed of a plurality of servers, or may be implemented as a single server. When being the software, the server 105 may be implemented as a plurality of pieces of software or a plurality of software modules (e.g., software or software modules for providing a distributed service), or may be implemented as a single piece of software or a single software module, which will not be specifically limited here.

It should be noted that the method for building a database for retrieval provided in embodiments of the present disclosure is generally performed by the server 105. Correspondingly, the apparatus for building a database for retrieval is generally provided in the server 105.

It should be appreciated that the numbers of the terminal devices, the networks and the servers in FIG. 1 are merely illustrative. Any number of terminal devices, networks and servers may be provided based on actual requirements.

Figure 2:
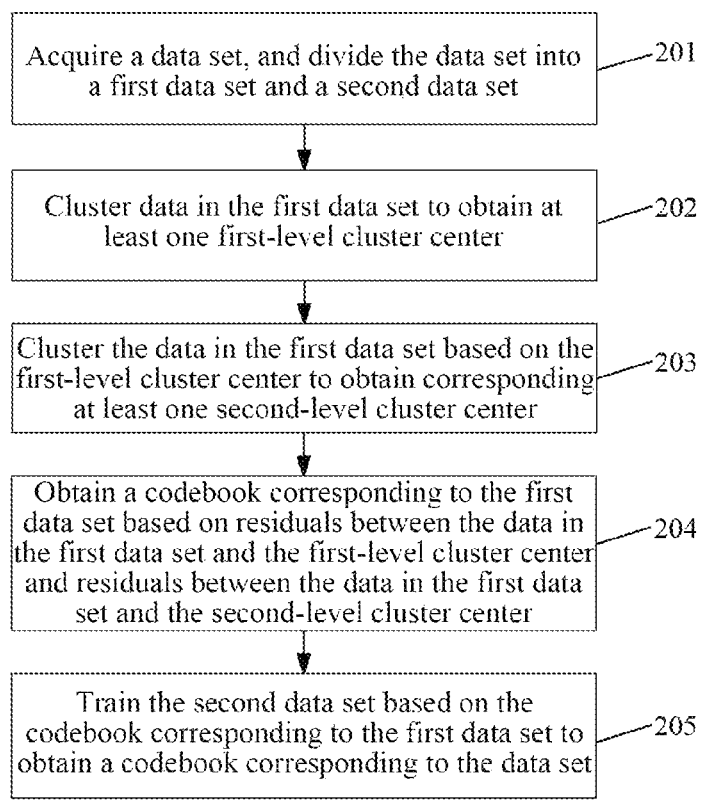
FIG. 2 is a flowchart of a method for building a database for retrieval according to an embodiment of the present disclosure.

Further referring to FIG. 2, FIG. 2 illustrates a flow 200 of a method for building a database for retrieval according to an embodiment of the present disclosure. The method for building a database for retrieval includes the following steps:

Step 201, acquiring a data set, and dividing the data set into a first data set and a second data set.

In this embodiment, an executing body (e.g., the server 105 shown in FIG. 1) of the method for building a database for retrieval may acquire the data set. The data set may include original data acquired by various means. The data in the original data may be an image, a video and/or an audio, etc. Then, the feature(s) of each piece of original data is extracted to obtain a feature set (i.e., the data set described above) corresponding to an original data set. The amount of data in the data set may typically be on the order of hundreds of billions or even trillions, and each piece of data therein is typically multidimensional.

After acquiring the data set, the above executing body divides the data set into the first data set and the second data set. For example, the first data set may be obtained by performing random sampling on the data set. Then, the part of the data set except the first data set is used as the second data set. It should be noted that the amount of data in the first data set is much less than the amount of data in the second data set. For example, when the amount of data in the data set is 100 million, the amount of the data in the first data set may be 5 million.

Step 202, clustering data in the first data set, to obtain at least one first-level cluster center.

In this embodiment, the above executing body may cluster the data in the first data set by using a clustering algorithm, thus obtaining the at least one first-level cluster center. The clustering algorithm refers to a method of automatically dividing a bunch of data with no tags into several classes (clusters), which belongs to an unsupervised learning method. This method is to cluster similar samples having little difference between each other into one class (cluster) according to the distance or similarity (affinity) between samples, finally forming a plurality of clusters. Moreover, the center of each cluster (i.e., the cluster center) can be obtained. The obtained cluster center is related to all the data within the coverage range of the cluster center, and is a mean vector of all the data. The vector of the cluster center is capable of fully describing the data distribution under the cluster center, and there is a certain discrimination between different cluster centers.

Alternatively, the data in the first data set may be clustered by using a K-Means clustering algorithm, to obtain a corresponding first-level subspace and at least one corresponding first-level cluster center. Particularly, a value of K is first set, that is, a desired number of clusters is set. Then, K data points are randomly selected from the first data set as centroids (cluster centers). Then, for each point in the first data set, a distance (e.g., a Euclidean distance) from the point to each centroid is calculated. If the point is closer to a certain centroid, the point is divided into the set to which the certain centroid belongs. After all the data is classified into sets, there will be K sets totally. Then, the centroid of each set is re-calculated. If the distance between the re-calculated centroid and the original centroid is less than a certain set threshold (indicating that the position of the re-calculated centroid does not change much and tends to be stable or convergent), it can be considered that the clustering has already achieved the desired result, the algorithm is terminated. However, if there is a great change in the distance between the new centroid and the original centroid, it is required to iterate the above step until the position tends to be stable. Clearly, other clustering algorithms may alternatively be selected to cluster the data in the first data set, which is not specifically limited in embodiments of the present disclosure.

The data in the first-level subspace is subsequently grouped again. Therefore, in this step, it is only required to ensure that there is a certain discrimination between different first-level cluster centers, and there is no need to divide the data in the first-level subspace finely.

Step 203, clustering the data in the first data set based on the first-level cluster center, to obtain corresponding at least one second-level cluster center.

In this embodiment, the above executing body may cluster the data in the first data set again based on the first-level cluster center obtained in step 202, thereby obtaining a corresponding second-level subspace and the corresponding at least one second-level cluster center. Here, the data distribution in the second-level subspace is similar to the data distribution in the first-level subspace, and a plurality of subsets in the second-level cluster center may accurately describe each subspace.

As an example, the residual vector between a piece of first data in the first data set and a first-level cluster center closest to the piece of first data may be calculated, thus obtaining the residual vector corresponding to each piece of first data. Residual vectors corresponding to the pieces of first data constitute a residual vector space, the residual vector space describing the relative position distribution of data and cluster centers. Then, K-Means clustering algorithm is used to cluster the residual vector space to describe the distribution of data within a new space, thus obtaining the corresponding at least one second-level cluster center.

It should be noted that, the data belonging to the same cluster center in the first-level subspace may belong to any cluster center in the second level subspace; and the residual vectors belonging to the same cluster center in the second-level subspace may come from cluster centers of different first-level subspaces. Pieces of data which belong to a same cluster center in the first-level subspace and also belong to a same cluster in the second-level subspace are considered to be highly similar to each other.

For example, it is assumed that, on a data set of a scale that the amount of data is 400 million, the number of first-level subspaces A is 5,000 and the total number of samples in each subspace is about 80,000 on average, and the second-level subspace B is further partitioned into 5,000 subspaces. For a certain subspace $C_i$ in A, all samples under the subspace $C_i$ are allowed to belong to $\{F_n, F_m \ldots F_t\}$, and $\{F_n, F_m \ldots F_t\}$ is a subset of $\{F_0, F_1 \ldots F_h\}$. Each sample may be identified by a cluster center pair, i.e., $\{(C_i, F_n),(C_i, F_m), \ldots ,(C_i, F_t)\}$. At this time, the training cost is 2*5000 cluster centers, which is greatly reduced as compared with the cost of $200000(\sqrt{n}*c)$. In addition, by layering the cluster centers, the amount of calculation during the building of a database is reduced, thereby improving the efficiency of building the database and the efficiency of a retrieval.

Step 204, obtaining a codebook corresponding to the first data set based on residuals between the data in the first data set and the first-level cluster center and residuals between the data in the first data set and the second-level cluster center.

In this embodiment, the above executing body may obtain the codebook corresponding to the first data set based on residuals between the data in the first data set and the first-level cluster center and residuals between the data in the first data set and the second-level cluster center. As an example, a first-level cluster center and a second-level cluster center to which a piece of first data in the first data set belongs may be calculated. Then, the residual between the piece of first data in the first data set and the first-level cluster center and the residual between the piece of first data in the first data set and the second-level cluster center may be calculated to obtain a new feature space (residual vector space), and then a quantization is performed in the new feature space. Since the value range of the features in the new feature space is greatly reduced, the quantization loss may also be greatly reduced.

Alternatively, a quantization approach may be a PQ quantization (product quantization), which belongs to a classical ANN algorithm. The PQ quantization may reduce storage, reduce an amount of computation, and reduce the amount of computation. By performing the PQ quantization on the new feature space, the codebook corresponding to the first data set can be obtained. When the PQ quantization is used, an one-quarter quantization is generally used.

Step 205, training the second data set based on the codebook corresponding to the first data set, to obtain a codebook corresponding to the data set.

In this embodiment, the above executing body may train the second data set based on the codebook corresponding to the first data set, to obtain the codebook corresponding to the data set. That is, the above executing body may identify a feature vector in the second data set by using the ID (Identity Document, identity identification number) of the cluster center in the codebook corresponding to the first data set, such that there is no need to load the original feature vector during the retrieval, thereby reducing the memory required during the retrieval.

According to the method for building a database for retrieval provided in the embodiment of the present disclosure, first, the data set is acquired and the data set is divided into the first data set and the second data set; then, the data in the first data set is clustered to obtain the at least one first-level cluster center; next, the data in the first data set is clustered based on the first-level cluster center to obtain the corresponding at least one second-level cluster center, and the codebook corresponding to the first data set is obtained based on the residuals between the data in the first data set and the first-level cluster center and the residuals between the data in the first data set and the second-level cluster center; and finally, the second data set is trained based on the codebook corresponding to the first data set to obtain the codebook corresponding to the data set. The method for building a database for retrieval in this embodiment belongs to an inverted index method. According to this method, the feature vector space is divided, which shortens the training time, and the obtained cluster center can better describe the data distribution. In addition, the new feature space is quantized, which reduces the quantization loss and reduces the memory required during the retrieval. Moreover, this method supports a variety of database building modes and supports real-time/daily/weekly/monthly index updates, thus providing basic retrieval capabilities of high recall, high throughput, low delay and low memory.

In the technical solution of the present disclosure, the collection, storage, use, processing, transmission, provision, disclosure, etc. of the personal information of a user all comply with the provisions of the relevant laws and regulations, and do not violate public order and good customs.

Figure 3:
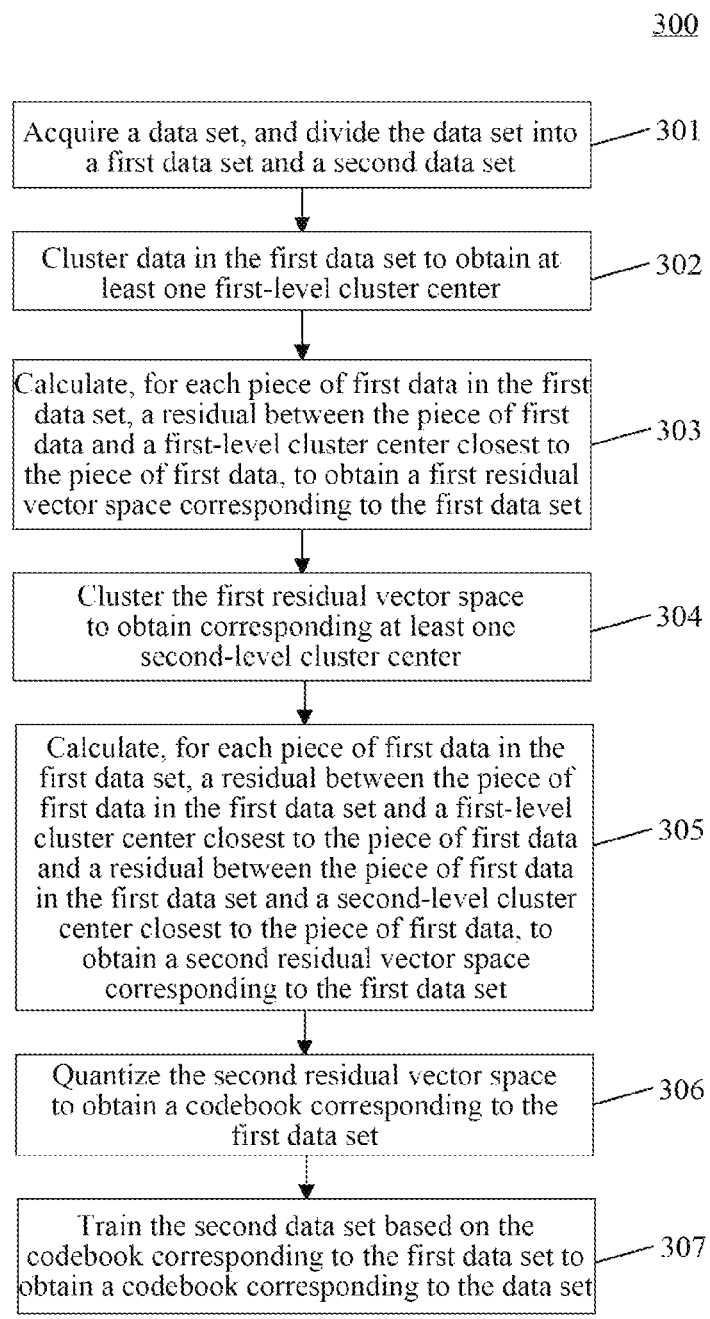
FIG. 3 is a flowchart of the method for building a database for retrieval according to another embodiment of the present disclosure.

Further referring to FIG. 3, FIG. 3 illustrates a flow 300 of a method for building a database for retrieval according to another embodiment of the present disclosure. The method for building a database for retrieval includes the following steps:

Step 301, acquiring a data set, and dividing the data set into a first data set and a second data set.

Step 302, clustering data in the first data set to obtain at least one first-level cluster center.

Steps 301-302 are substantially consistent with steps 201-202 in the foregoing embodiment. For detailed implementations, reference may be made to the foregoing descriptions of steps 201-202, and thus, the details will not be repeatedly described here.

Step 303, for each piece of first data in the first data set, calculating a residual between the piece of first data and a first-level cluster center closest to the piece of first data, to obtain a first residual vector space corresponding to the first data set.

In this embodiment, for each piece of first data in the first data set, an executing body (e.g., the server 105 shown in FIG. 1) of the method for building a database for retrieval may calculate the residual between the piece of first data and the first-level cluster center closest to the piece of first data, to obtain the first residual vector space corresponding to the first data set. The residual vector space describes the relative position distribution of data and cluster centers. Here, the first-level cluster center closest to the piece of first data may be determined through a distance calculation result.

Step 304, clustering the first residual vector space to obtain corresponding at least one second-level cluster center.

In this embodiment, the above executing body may cluster the first residual vector space obtained in step 303, thus obtaining the corresponding at least one second-level cluster center. Particularly, a K-Means clustering algorithm may be used to cluster data in the first residual vector space. The first-level and second-level cluster centers divide the entire data space into a plurality of subspaces, and all first-level cluster centers share the at least one second-level cluster center.

By clustering the data in the first data set, the first-level cluster center and the second-level cluster center are obtained, thereby performing a finer space division on a large-scale data set, such that the vector of the cluster center is capable of better representing all the data under the cluster center, and then better describe the distribution situation of the data.

Step 305, for the each piece of first data in the first data set, calculating a residual between the piece of first data in the first data set and a first-level cluster center closest to the piece of first data and a residual between the piece of first data in the first data set and a second-level cluster center closest to the piece of first data, to obtain a second residual vector space corresponding to the first data set.

In this embodiment, for each piece of first data in the first data set, the above executing body may obtain the second residual vector space corresponding to the first data set based on the residual between each piece of first data in the first data set and a first-level cluster center closest to the each piece of first data and a residual between the piece of first data in the first data set and a second-level cluster center closest to the piece of first data. For example, the residual between each piece of first data and the first-level cluster center closest to the each piece of first data, and the residual between each piece of first data and the second-level cluster center closest to the each piece of first data, can be calculated, thus obtaining the corresponding second residual vector space.

Step 306, quantizing the second residual vector space to obtain a codebook corresponding to the first data set.

In this embodiment, the above executing body may quantize the second residual vector space obtained in step 305, thus obtaining the codebook corresponding to the first data set. Alternatively, a quantization approach may be a PQ quantization, and an one-quarter quantization is generally used. A PQ quantization loss is expressed as, in each feature dimension, a difference value between a feature value and a cluster center. When the range of values of sample features is large in each dimension, an increase in the quantization loss is inevitably caused by using a fixed number of cluster centers to represent the sample features. Therefore, the second residual vector space is quantized in this step, which reduces the range of values of the features, thereby reducing the quantization loss. The PQ quantization may reduce storage, reduce an amount of computation, and reduce the amount of computation.

In some alternative implementations of this embodiment, step 306 includes: dividing the second residual vector space into a first preset number of subspaces; performing clustering operation respectively on each subspace in the first preset number of subspaces, to obtain a second preset number of spatial cluster centers; marking respectively identification documents (IDs) of the spatial cluster centers to obtain a codebook of the each subspace; and performing a direct product on the codebooks of the subspaces to obtain the codebook corresponding to the first data set. Here, the first preset number and the second preset number may be set according to actual situations, which is not specifically limited in embodiments of the present disclosure.

Particularly, it is assumed that there are N training samples, and the number of dimensions D of each sample are 64. Each sample is divided into M=8 segments, and each segment is clustered into K=256 classes to obtain M*K cluster centers. The number of dimensions of each cluster center are D/M, and these cluster centers are called a codebook. The codebook is obtained through training, and then stored. For each sub-segment M, a nearest cluster center U(M) is found from K cluster centers. A list of tags of subclasses for each class is stored. The training is completed in this way. For the N samples, only K*M cluster centers and N*M tags of samples corresponding to the cluster centers are finally stored, thereby greatly reducing the storage memory of the data, and reducing the amount of computation and the amount of computation.

Step 307, training the second data set based on the codebook corresponding to the first data set, to obtain a codebook corresponding to the data set.

Step 307 is substantially consistent with step 205 in the foregoing embodiment. For the detailed implementation, reference may be made to the foregoing description of step 205, and thus, the details will not be repeatedly described herein.

It can be seen from FIG. 3 that, as compared with the embodiment corresponding to FIG. 2, the method for building a database for retrieval in this embodiment emphasizes the process of obtaining the second-level cluster center and the process of obtaining the codebook corresponding to the first data set. Accordingly, a finer space division is performed on the data set, which reduces the retrieval delay and improves the recall rate of the retrieval, thereby saving the memory.

Figure 4:
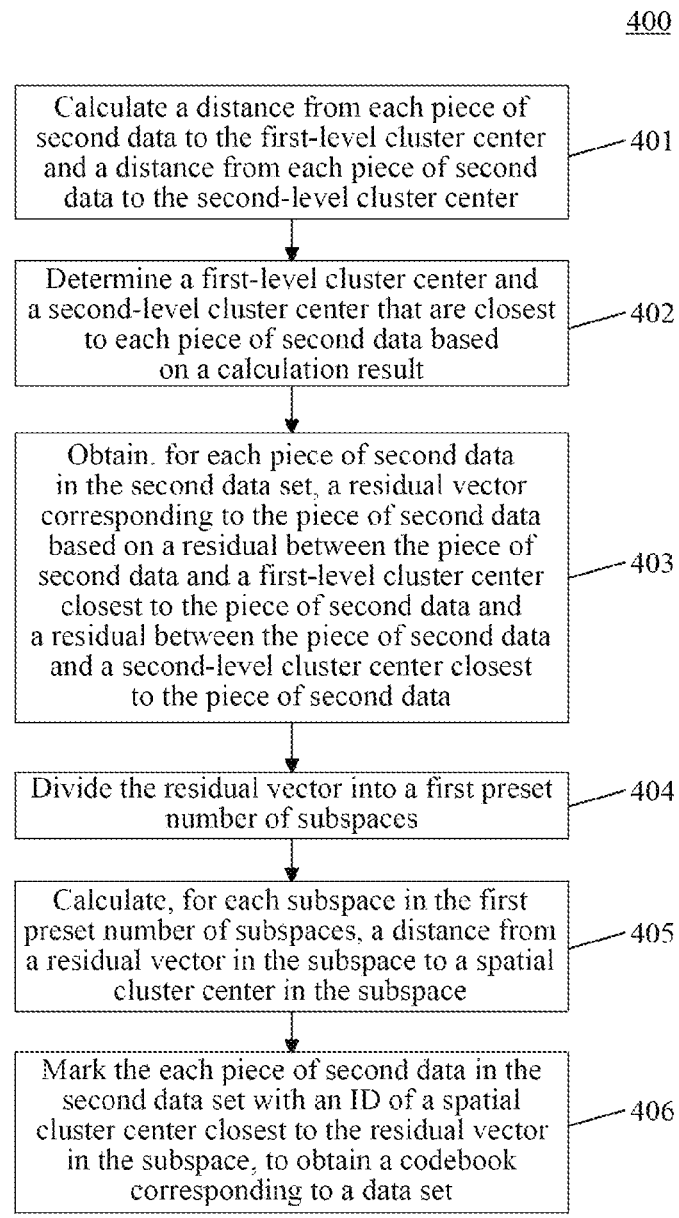
FIG. 4 is an exploded flow diagram of a training step in the method for building a database for retrieval shown in FIG. 3.

Further referring to FIG. 4, FIG. 4 illustrates an exploded flow 400 of the training step in the method for building a database for retrieval shown in FIG. 3. The training step is decomposed as follows:

Step 401, calculating distances from second data to a first-level cluster center and to a second-level cluster center.

In this embodiment, for each piece of second data in the second data set, the distance from the piece of second data to each first-level cluster center and the distance from the piece of second data to each second-level cluster center are calculated. Here, a distance may be an Euclidean distance (L2 distance) or a cosine distance (COS distance). The calculation approach of the Euclidean distance or cosine distance is an existing technology, and thus will not be repeatedly described herein.

In some alternative implementations of this embodiment, step 401 includes: calculating a first distance from second data to the first-level cluster center; and performing a pruning operation in response to determining that the first distance and a second distance from the first-level cluster center to the second-level cluster center do not satisfy a triangle inequality.

In this embodiment, in an L2/COS distance space, any three points satisfy the triangle inequality. After the first distance from the second data to the first-level cluster center is calculated, since the distance between the first-level cluster center and the second-level cluster center is known, the pruning operation may be performed according to the triangle inequality. That is, according to the triangle inequality, the upper bound of the second data and each subspace may be pre-determined, all subspaces are sorted according to a certain rule, and pruning is performed according to the distance upper bound, thereby greatly reducing the overall amount of calculation. The triangle inequality may be expressed in the form of:

$$d(O_x, O_y) \leq d(O_x, O_z) + d(O_z, O_y).$$

Here, $O_x$, $O_y$, $O_z$ represent any three points in a space, i.e., the above second data, the above first-level cluster center, and the above second-level cluster center, and d represents a distance between any two points.

A verification is performed on 10 million SIFT1B data sets. Through the pruning, 94% of calculations for vectors can be pruned, thereby greatly reducing the time taken to build the database. In addition, the pruning approach may be reused in any process in which the distance from a sample to a subspace needs to be calculated in training and retrieval processes.

In some alternative implementations of this embodiment, step 401 further includes: in response to determining that the first distance and the second distance satisfy the triangle inequality, calculating a distance from the second data to the second-level cluster center. That is, the distance from the second data to the second-level cluster center is calculated only in the situation where the first distance and the second distance satisfy the triangle inequality. By judging whether the first distance and the second distance satisfy the triangle inequality, the amount of calculation is reduced.

Step 402, determining a first-level cluster center and a second-level cluster center that are closest to the second data based on a calculation result.

In this embodiment, the first-level cluster center and the second-level cluster center that are closest to the second data are determined based on the calculation result in step 401. The smaller the calculation result in step 401 is, the closer the distance is. Accordingly, the closest first-level cluster center and the closest second-level cluster center are determined.

Step 403, for each piece of second data in a second data set, obtaining a residual vector corresponding to the each piece of second data based on a residual between the each piece of second data and a first-level cluster center closest to the piece of second data and a residual between the each piece of second data and a second-level cluster center closest to the second data.

In this embodiment, for each piece of second data in the second data set, after the first-level cluster center and the second-level cluster center that are closest to the piece of second data are determined, the residual between the piece of second data and the first-level cluster center closest to the second data and the residual between the piece of second data and the second-level cluster center closest to the second data may be calculated, thus obtaining the residual vector corresponding to the piece of second data.

Step 404, dividing the residual vector into a first preset number of subspaces.

In this embodiment, the residual vector obtained in step 403 may be divided into the first preset number of subspaces. Here, the first preset number may be set according to actual situations.

Step 405, calculating, for each subspace in the first preset number of subspaces, distances from a residual vector in the subspace to spatial cluster centers in the subspace.

In this embodiment, for the each subspace in the first preset number of subspaces, the distances from the residual vector in the each subspace to the spatial cluster centers in the subspace may be calculated. Accordingly, the spatial cluster center closest to the residual vector in this subspace is determined, and the ID of the cluster center is recorded.

Step 406, marking the each piece of second data in the second data set with an ID of a spatial cluster center closest to the residual vector in the subspace, to obtain a codebook corresponding to a data set.

In this embodiment, the each piece of second data in the second data set may be marked with the ID of the spatial cluster center closest to the residual vector in the subspace and determined in step 405, thus obtaining the codebook corresponding to the data set.

As can be seen from FIG. 4, in this training method, the second data in the second data set may be marked with the IDs of cluster centers in the first data set, such that there is no need to load the original feature vector during the retrieval, thereby greatly reducing the memory required during the retrieval.

Figure 5:
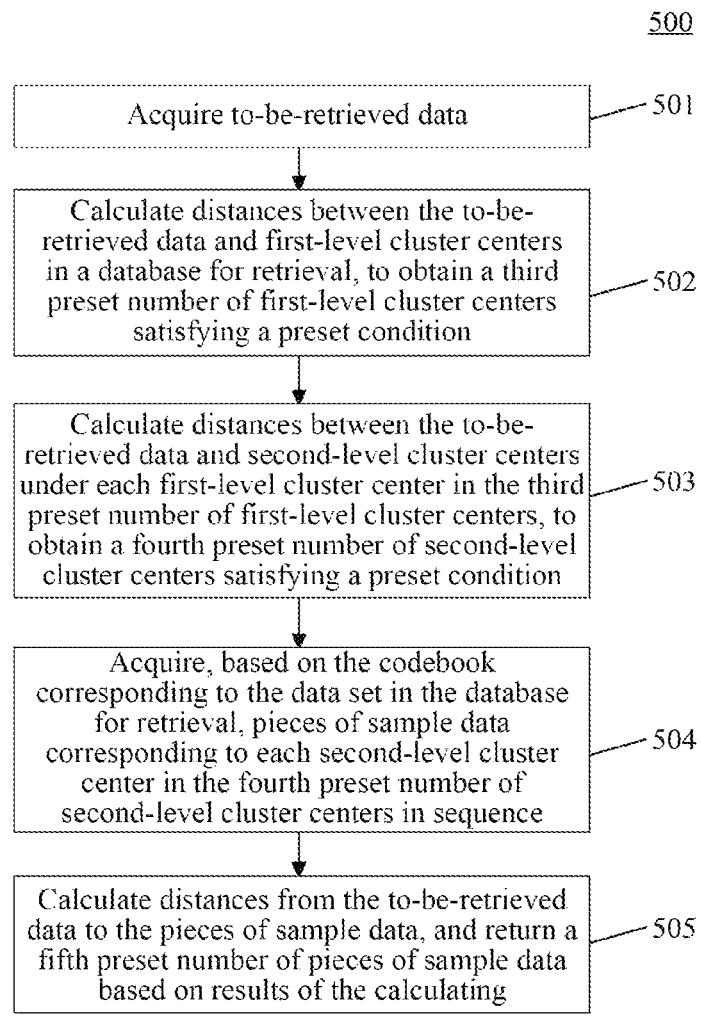
FIG. 5 is a flowchart of a method for performing a retrieval according to an embodiment of the present disclosure.

Further referring to FIG. 5, FIG. 5 illustrates a flow 500 of a method for performing a retrieval according to an embodiment of the present disclosure. The method for performing a retrieval includes the following steps:

Step 501, acquiring to-be-retrieved data.

In this embodiment, an executing body (e.g., the server 105 shown in FIG. 1) of the method for performing a retrieval may acquire the to-be-retrieved data. Here, the to-be-retrieved data may be an image, a video and/or an audio. Alternatively, after acquiring the to-be-retrieved data, the above executing body extracts the feature of the to-be-retrieved data, and performs normalization processing on the extracted feature, so as to perform a better retrieval.

Step 502, calculating distances between the to-be-retrieved data and first-level cluster centers in a database for retrieval, to obtain a third preset number of first-level cluster centers satisfying a preset condition.

In this embodiment, the above executing body may calculate the distance from the to-be-retrieved data to each first-level cluster center in the database for retrieval, and perform sorting based on the calculation result, for example, perform sorting in an ascending order, thus obtaining the third preset number of first-level cluster centers satisfying the preset condition. Here, the third preset number may be set according to actual situations. For example, the third preset number is set to 10. That is, 10 first-level cluster centers closest to the to-be-retrieved data are selected according to the result of the sorting in the ascending order, and the unselected subspace will not be accessed in the subsequent retrieval process, thereby reducing the amount of calculation and the time consumption. Here, the database for retrieval is obtained through the method in the foregoing embodiment.

Step 503, calculating distances between the to-be-retrieved data and second-level cluster centers under each first-level cluster center in the third preset number of first-level cluster centers, to obtain a fourth preset number of second-level cluster centers satisfying a preset condition.

In this embodiment, after determining the third preset number of first-level cluster centers closest to the to-be-retrieved data, the above executing body may calculate the distances between the to-be-retrieved data and the second-level cluster centers under the each first-level cluster center in the third preset number of first-level cluster centers, and sort the calculation results, for example, in an ascending order, thus obtaining the fourth preset number of second-level cluster centers satisfying the preset condition. For example, the fourth preset number is set to 20. That is, 20 second-level cluster centers closest to the to-be-retrieved data are selected according to the result of the sorting in the ascending order. Accordingly, when the number of the first-level cluster centers is 10, 10*20=200 second-level cluster centers are obtained altogether.

Step 504, acquiring, based on the codebook corresponding to the data set in the database for retrieval, sample data corresponding to each second-level cluster center in the fourth preset number of second-level cluster centers in sequence.

In this embodiment, based on the codebook corresponding to the data set obtained when the database for retrieval is built, the above executing body may start from the nearest second-level cluster center to extract the corresponding sample data in sequence in the manner of a priority queue.

Step 505, calculating distances between the to-be-retrieved data and the sample data, and returning a fifth preset number of pieces of sample data based on a calculation result.

In this embodiment, the above executing body may calculate the distances between the to-be-retrieved data and the sample data extracted in step 504, and sort the calculation results, thereby returning the fifth preset number of pieces of sample data. The fifth preset number may be set according to actual situations. Assuming that the fifth preset number is set to 200, the above executing body returns the top 200 pieces of sample data closest to the to-be-retrieved data based on the sorting result.

According to the method for performing a retrieval provided in embodiments of the present disclosure, first, the to-be-retrieved data is acquired; then, the distances from the to-be-retrieved data to the first-level cluster centers in the database for retrieval are calculated, to obtain the third preset number of first-level cluster centers satisfying the preset condition; next, the distances from the to-be-retrieved data to the second-level cluster centers under each first-level cluster center in the third preset number of first-level cluster centers are calculated, to obtain the fourth preset number of second-level cluster centers satisfying the preset condition, and the sample data corresponding to the each second-level cluster center in the fourth preset number of second-level cluster centers in sequence is acquired based on the codebook corresponding to the data set in the database for retrieval; and finally, the distances from the to-be-retrieved data to the sample data are calculated, and the fifth preset number of pieces of sample data are returned based on the calculation result. According to the method for performing a retrieval in this embodiment, the retrieval is performed based on the pre-built database for retrieval, which improves the recall rate of the retrieval and reduces the retrieval delay, thereby improving the efficiency of the retrieval.

Figure 6:
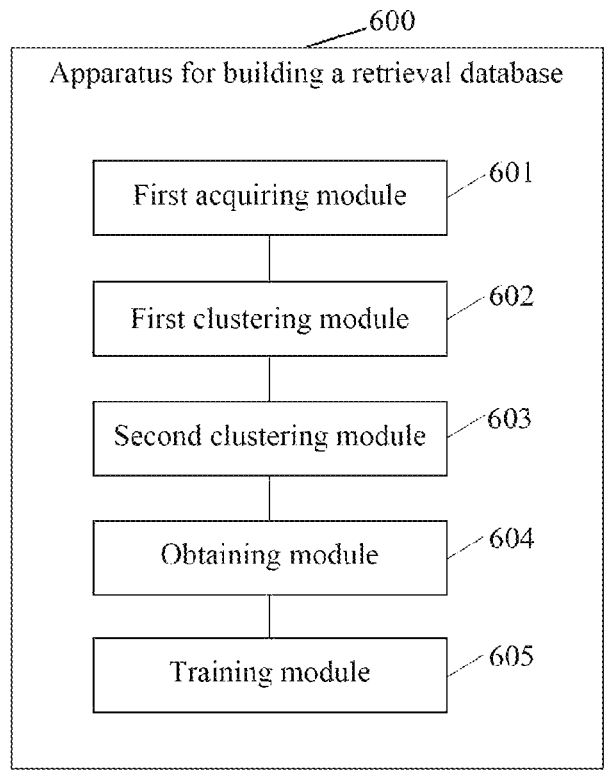
FIG. 6 is a schematic structural diagram of an apparatus for building a database for retrieval according to an embodiment of the present disclosure.

Further referring to FIG. 6, as an implementation of the method shown in the above drawings, an embodiment of the present disclosure provides an apparatus for building a database for retrieval. The embodiment of the apparatus corresponds to the embodiment of the method shown in FIG. 2, and the apparatus may be applied in various electronic devices.

As shown in FIG. 6, the apparatus 600 for building a database for retrieval in this embodiment includes: a first acquiring module 601, a first clustering module 602, a second clustering module 603, an obtaining module 604 and a training module 605. Here, the first acquiring module 601 is configured to acquire a data set, and divide the data set into a first data set and a second data set, where an amount of data in first data set is less than an amount of data in second data set. The first clustering module 602 is configured to cluster the data in the first data set to obtain at least one first-level cluster center. The second clustering module 603 is configured to cluster the data in the first data set based on the first-level cluster center to obtain corresponding at least one second-level cluster center. The obtaining module 604 is configured to obtain a codebook corresponding to the first data set based on residuals between the data in the first data set and the first-level cluster center and residuals between the data in the first data set and the second-level cluster center. The training module 605 is configured to train the second data set based on the codebook corresponding to the first data set to obtain a codebook corresponding to the data set.

In this embodiment, for specific processes of the first acquiring module 601, the first clustering module 602, the second clustering module 603, the obtaining module 604 and the training module 605 in the apparatus 600 for building a database for retrieval, and their technical effects, reference may be respectively made to the related descriptions of steps 201-205 in the corresponding embodiment of FIG. 2, and thus, the details will not be repeatedly described here.

In some alternative implementations of this embodiment, the second clustering module includes: a first calculating submodule, configured to calculate, for each piece of first data in the first data set, a residual between the each piece of first data and a first-level cluster center closest to the piece of first data, to obtain a first residual vector space corresponding to the first data set; and a clustering submodule, configured to cluster the first residual vector space to obtain the corresponding at least one second-level cluster center.

In some alternative implementations of this embodiment, the obtaining module includes: a first obtaining submodule, configured to calculate, for the each piece of first data in the first data set, a residual between the each piece of first data in the first data set and a first-level cluster center closest to the each piece of first data and a residual between the each piece of first data in the first data set and a second-level cluster center closest to the each piece of first data, to obtain a second residual vector space corresponding to the first data set; a quantizing submodule, configured to quantize the second residual vector space to obtain the codebook corresponding to the first data set.

In some alternative implementations of this embodiment, the quantizing submodule includes: a dividing unit, configured to divide the second residual vector space into a first preset number of subspaces; a clustering unit, configured to perform clustering operation on each subspace in the first preset number of subspaces respectively, to obtain a second preset number of spatial cluster centers; a marking unit, configured to mark respectively identification documents (IDs) of the spatial cluster centers, to obtain a codebook of the each subspace; and a direct product unit, configured to perform a direct product on the codebooks of the subspaces, to obtain the codebook corresponding to the first data set.

In some alternative implementations of this embodiment, the training module includes: a second obtaining submodule, configured to obtain, for each piece of second data in the second data set, a residual vector corresponding to the each piece of second data based on a residual between the each piece of second data and a first-level cluster center closest to the piece of second data and a residual between the each piece of second data and a second-level cluster center closest to the piece of second data; a dividing submodule, configured to divide the residual vector corresponding to the each piece of second data into the first preset number of subspaces, to obtain residual vector in each subspace; a second calculating submodule, configured to calculate, for each subspace in the first preset number of subspaces, a distance from the residual vector in the subspace to a spatial cluster center in the subspace; and a third obtaining submodule, configured to mark the each piece of second data in the second data set with an ID of a spatial cluster center closest to the residual vector in the each subspace, to obtain the codebook corresponding to the data set.

In some alternative implementations of this embodiment, the training module further includes: a third calculating submodule, configured to calculate a distance from the each piece of second data to the first-level cluster center and a distance from the each piece of second data to the second-level cluster center; and a determining submodule, configured to determine the first-level cluster center closest to the each piece of second data and the second-level cluster center closest to the each piece of second data based on a result of the calculating.

In some alternative implementations of this embodiment, the third calculating submodule includes: a first calculating unit, configured to calculate a first distance from the each piece of second data to the first-level cluster center; and a pruning unit, configured to perform a pruning operation in response to determining that the first distance and a second distance between the first-level cluster center and the second-level cluster center do not satisfy a triangle inequality.

In some alternative implementations of this embodiment, the third calculating submodule further includes: a second calculating unit, configured to calculate a distance from the each piece of second data to the second-level cluster center in response to determining that the first distance and the second distance satisfy the triangle inequality.

Figure 7:
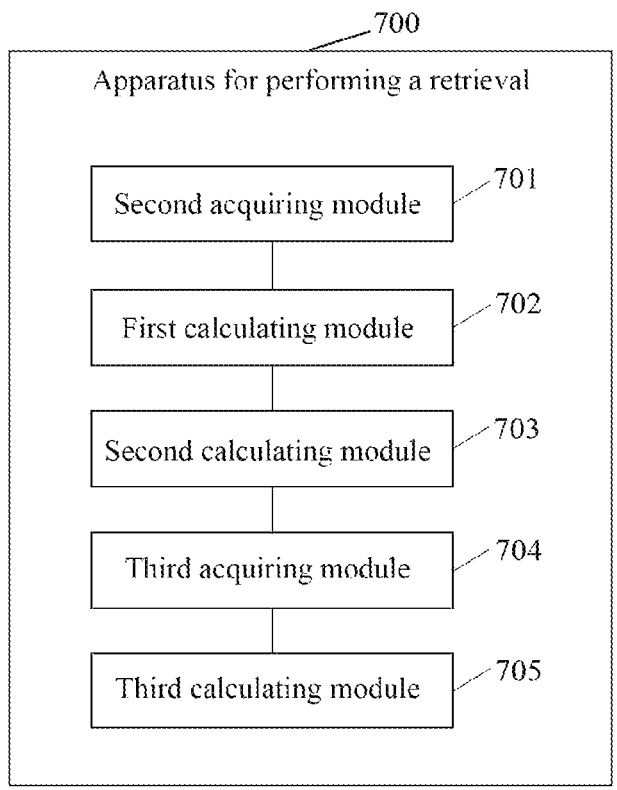
FIG. 7 is a schematic structural diagram of an apparatus for performing a retrieval according to an embodiment of the present disclosure.

Further referring to FIG. 7, as an implementation of the method shown in the above drawings, an embodiment of the present disclosure provides an apparatus for performing a retrieval. The embodiment of the apparatus corresponds to the embodiment of the method shown in FIG. 5, and the apparatus may be applied in various electronic devices.

As shown in FIG. 7, the apparatus 700 for performing a retrieval in this embodiment includes: a second acquiring module 701, a first calculating module 702, a second calculating module 703, a third acquiring module 704 and a third calculating module 705. Here, the second acquiring module 701 is configured to acquire to-be-retrieved data. The first calculating module 702 is configured to calculate distances between the to-be-retrieved data and first-level cluster centers in a database for retrieval, to obtain a third preset number of first-level cluster centers satisfying a preset condition. The second calculating module 703 is configured to calculate distances between the to-be-retrieved data and second-level cluster centers under each first-level cluster center in the third preset number of first-level cluster centers, to obtain a fourth preset number of second-level cluster centers satisfying a preset condition. The third acquiring module 704 is configured to acquire, based on the codebook corresponding to the data set in the database for retrieval, pieces of sample data corresponding to each second-level cluster center in the fourth preset number of second-level cluster centers in sequence. The third calculating module 705 is configured to calculate distances from the to-be-retrieved data to the pieces of sample data, and returning a fifth preset number of pieces of sample data based on results of the calculating.

In this embodiment, for specific processes of the second acquiring module 701, the first calculating module 702, the second calculating module 703, the third acquiring module 704 and the third calculating module 705 in the apparatus 700 for performing a retrieval, and their technical effects, reference may be respectively made to the related descriptions of steps 501-505 in the corresponding embodiment of FIG. 5, and thus, the details will not be repeatedly described here.

According to an embodiment of the present disclosure, an embodiment of the present disclosure further provides an electronic device, a readable storage medium, and a computer program product.

Figure 8:
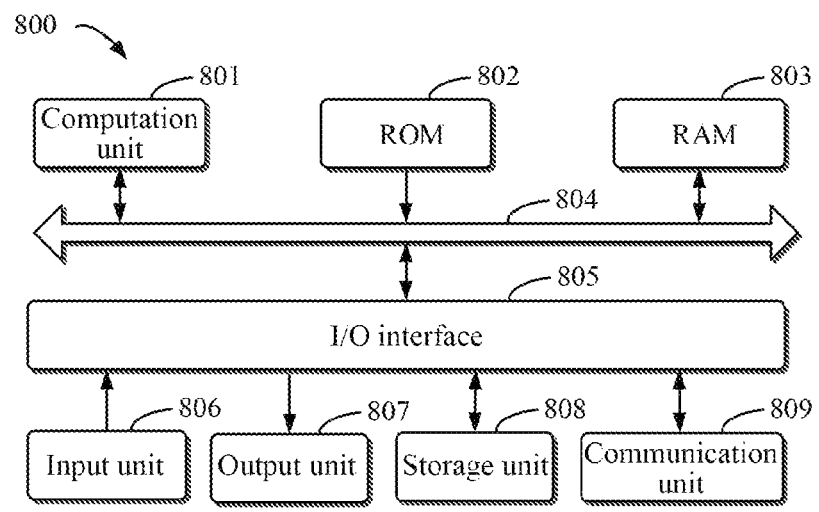
FIG. 8 is a block diagram of an electronic device used to implement the method for building a database for retrieval according to embodiments of the present disclosure.

FIG. 8 is a schematic block diagram of an exemplary electronic device 800 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 8, the device 800 includes a computation unit 801, which may perform various appropriate actions and processing, based on a computer program stored in a read-only memory (ROM) 802 or a computer program loaded from a storage unit 808 into a random access memory (RAM) 803. In the RAM 803, various programs and data required for the operation of the device 800 may also be stored. The computation unit 801, the ROM 802, and the RAM 803 are connected to each other through a bus 804. An input/output (I/O) interface 805 is also connected to the bus 804.

A plurality of parts in the device 800 are connected to the I/O interface 805, including: an input unit 806, for example, a keyboard and a mouse; an output unit 807, for example, various types of displays and speakers; the storage unit 808, for example, a disk and an optical disk; and a communication unit 809, for example, a network card, a modem, or a wireless communication transceiver. The communication unit 809 allows the device 800 to exchange information/data with other devices over a computer network such as the Internet and/or various telecommunication networks.

The computation unit 801 may be various general-purpose and/or dedicated processing components having processing and computing capabilities. Some examples of the computation unit 801 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 801 performs the various methods and processes described above, such as a method for building a database for retrieval or a method for performing a retrieval. For example, in some embodiments, the method for building a database for retrieval and/or the method for performing a retrieval may be implemented as a computer software program, which is tangibly included in a machine readable medium, such as the storage unit 808. In some embodiments, part or all of the computer program may be loaded and/or installed on the device 800 via the ROM 802 and/or the communication unit 809. When the computer program is loaded into the RAM 603 and executed by the computation unit 801, one or more steps of the method for building a database for retrieval or the method for performing a retrieval described above may be performed. Alternatively, in other embodiments, the computation unit 801 may be configured to perform the method for building a database for retrieval or the method for performing a retrieval by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for building a database for retrieval, comprising:
    acquiring a data set, and dividing the data set into a first data set and a second data set, wherein an amount of data in first data set is less than an amount of data in second data set;
    clustering the data in the first data set, to obtain at least one first-level cluster center;
    clustering the data in the first data set based on the first-level cluster center, to obtain corresponding at least one second-level cluster center;
    obtaining a codebook corresponding to the first data set based on residuals between the data in the first data set and the first-level cluster center and residuals between the data in the first data set and the second-level cluster center; and
    training the second data set based on the codebook corresponding to the first data set, to obtain a codebook corresponding to the data set.

2. The method according to claim 1, wherein the clustering the data in the first data set based on the first-level cluster center to obtain corresponding at least one second-level cluster center comprises:
    for each piece of first data in the first data set, calculating a residual between the each piece of first data and a first-level cluster center closest to the piece of first data, to obtain a first residual vector space corresponding to the first data set; and
    clustering the first residual vector space to obtain the corresponding at least one second-level cluster center.

3. The method according to claim 1, wherein the obtaining a codebook corresponding to the first data set based on residuals between the data in the first data set and the first-level cluster center and residuals between the data in the first data set and the second-level cluster center comprises:
    for the each piece of first data in the first data set, calculating a residual between the each piece of first data in the first data set and a first-level cluster center closest to the each piece of first data and a residual between the each piece of first data in the first data set and a second-level cluster center closest to the each piece of first data, to obtain a second residual vector space corresponding to the first data set; and
    quantizing the second residual vector space to obtain the codebook corresponding to the first data set.

4. The method according to claim 3, wherein the quantizing the second residual vector space to obtain the codebook corresponding to the first data set comprises:
    dividing the second residual vector space into a first preset number of subspaces;
    performing clustering operation on each subspace in the first preset number of subspaces respectively, to obtain a second preset number of spatial cluster centers;
    marking respectively identification documents (IDs) of the spatial cluster centers, to obtain a codebook of the each subspace; and
    performing a direct product on the codebooks of the subspaces, to obtain the codebook corresponding to the first data set.

5. The method according to claim 4, wherein the training the second data set based on the codebook corresponding to the first data set to obtain a codebook corresponding to the data set comprises:
    for each piece of second data in the second data set, obtaining a residual vector corresponding to the each piece of second data based on a residual between the each piece of second data and a first-level cluster center closest to the piece of second data and a residual between the each piece of second data and a second-level cluster center closest to the piece of second data;
    dividing the residual vector corresponding to the each piece of second data into the first preset number of subspaces, to obtain residual vector in each subspace;
    for each subspace in the first preset number of subspaces, calculating a distance from the residual vector in the each subspace to a spatial cluster center in the each subspace; and
    marking the each piece of second data in the second data set with an ID of a spatial cluster center closest to the residual vector in the each subspace, to obtain the codebook corresponding to the data set.

6. The method according to claim 5, wherein, before the residual vector corresponding to the each piece of second data is obtained based on the residual between the each piece of second data and the first-level cluster center closest to the piece of second data and the residual between the each piece of second data and the second-level cluster center closest to the second data, the method further comprises:
    calculating a distance from the each piece of second data to the first-level cluster center and a distance from the each piece of second data to the second-level cluster center; and determining the first-level cluster center closest to the each piece of second data and the second-level cluster center closest to the each piece of second data based on results of the calculating.

7. The method according to claim 6, wherein the calculating a distance from the each piece of second data to the first-level cluster center and a distance from the each piece of second data to the second-level cluster center, comprises:
calculating a first distance from the each piece of second data to the first-level cluster center; and
in response to determining that the first distance and a second distance between the first-level cluster center and the second-level cluster center do not satisfy a triangle inequality, performing pruning operation.

8. The method according to claim 7, wherein the calculating a distance from the each piece of second data to the first-level cluster center and a distance from the each piece of second data to the second-level cluster center further comprises:
in response to determining that the first distance and the second distance satisfy the triangle inequality, calculating a distance from the each piece of second data to the second-level cluster center.

9. The method according to claim 1, wherein the method further comprises performing a retrieval on the database for retrieval, the performing a retrieval on the database for retrieval comprises:
acquiring to-be-retrieved data;
calculating distances between the to-be-retrieved data and first-level cluster centers in a database for retrieval, to obtain a third preset number of first-level cluster centers;
calculating distances between the to-be-retrieved data and second-level cluster centers under each first-level cluster center in the third preset number of first-level cluster centers, to obtain a fourth preset number of second-level cluster centers;
acquiring, based on the codebook corresponding to the data set in the database for retrieval, pieces of sample data corresponding to each second-level cluster center in the fourth preset number of second-level cluster centers in sequence; and
calculating distances from the to-be-retrieved data to the pieces of sample data, and returning a fifth preset number of pieces of sample data based on results of the calculating.

10. An apparatus for building a database for retrieval, comprising:
at least one processor; and
a memory storing instructions, the instructions when executed by the at least one processor, cause the at least one processor to perform operations, the operations comprising:
acquiring a data set, and dividing the data set into a first data set and a second data set, wherein an amount of data in first data set is less than an amount of data in second data set;
clustering the data in the first data set to obtain at least one first-level cluster center;
clustering the data in the first data set based on the first-level cluster center to obtain corresponding at least one second-level cluster center;
obtaining a codebook corresponding to the first data set based on residuals between the data in the first data set and the first-level cluster center and residuals between the data in the first data set and the second-level cluster center; and training the second data set based on the codebook corresponding to the first data set to obtain a codebook corresponding to the data set.

11. The apparatus according to claim 10, wherein the clustering the data in the first data set based on the first-level cluster center to obtain corresponding at least one second-level cluster center comprises:
calculating, for each piece of first data in the first data set, a residual between the each piece of first data and a first-level cluster center closest to the piece of first data, to obtain a first residual vector space corresponding to the first data set; and
clustering the first residual vector space to obtain the corresponding at least one second-level cluster center.

12. The apparatus according to claim 10, wherein the obtaining a codebook corresponding to the first data set based on residuals between the data in the first data set and the first-level cluster center and residuals between the data in the first data set and the second-level cluster center comprises:
for the each piece of first data in the first data set, calculating a residual between the each piece of first data in the first data set and a first-level cluster center closest to the each piece of first data and a residual between the each piece of first data in the first data set and a second-level cluster center closest to the each piece of first data, to obtain a second residual vector space corresponding to the first data set; and
quantizing the second residual vector space to obtain the codebook corresponding to the first data set.

13. The apparatus according to claim 12, wherein the quantizing the second residual vector space to obtain the codebook corresponding to the first data set comprises:
dividing the second residual vector space into a first preset number of subspaces;
performing clustering operation on each subspace in the first preset number of subspaces respectively, to obtain a second preset number of spatial cluster centers;
marking respectively identification documents (IDs) of the spatial cluster centers, to obtain a codebook of the each subspace; and
performing a direct product on the codebooks of the subspaces, to obtain the codebook corresponding to the first data set.

14. The apparatus according to claim 13, wherein the training the second data set based on the codebook corresponding to the first data set to obtain a codebook corresponding to the data set comprises:
for each piece of second data in the second data set, obtaining a residual vector corresponding to the each piece of second data based on a residual between the each piece of second data and a first-level cluster center closest to the piece of second data and a residual between the each piece of second data and a second-level cluster center closest to the piece of second data;
dividing the residual vector corresponding to the each piece of second data into the first preset number of subspaces, to obtain residual vector in each subspace;
for each subspace in the first preset number of subspaces, calculating a distance from the residual vector in the subspace to a spatial cluster center in the subspace; and
marking the each piece of second data in the second data set with an ID of a spatial cluster center closest to the residual vector in the each subspace, to obtain the codebook corresponding to the data set.

15. The apparatus according to claim 14, wherein the training the second data set based on the codebook corresponding to the first data set to obtain a codebook corresponding to the data set further comprises:
  calculating a distance from the each piece of second data to the first-level cluster center and a distance from the each piece of second data to the second-level cluster center; and
  determining the first-level cluster center closest to the each piece of second data and the second-level cluster center closest to the each piece of second data based on a result of the calculating.

16. The apparatus according to claim 15, wherein the calculating a distance from the each piece of second data to the first-level cluster center and a distance from the each piece of second data to the second-level cluster center comprises:
  calculating a first distance from the each piece of second data to the first-level cluster center; and
  performing a pruning operation in response to determining that the first distance and a second distance between the first-level cluster center and the second-level cluster center do not satisfy a triangle inequality.

17. The apparatus according to claim 16, wherein the calculating a distance from the each piece of second data to the first-level cluster center and a distance from the each piece of second data to the second-level cluster center further comprises:
  calculating a distance from the each piece of second data to the second-level cluster center in response to determining that the first distance and the second distance satisfy the triangle inequality.

18. The apparatus according to claim 10, wherein the operations further comprise performing a retrieval on the database for retrieval, the performing a retrieval on the database for retrieval comprises:
  acquiring to-be-retrieved data;
  calculating distances between the to-be-retrieved data and first-level cluster centers in a database for retrieval, to obtain a third preset number of first-level cluster centers;
  calculating distances between the to-be-retrieved data and second-level cluster centers under each first-level cluster center in the third preset number of first-level cluster centers, to obtain a fourth preset number of second-level cluster centers;
  acquiring, based on the codebook corresponding to the data set in the database for retrieval, pieces of sample data corresponding to each second-level cluster center in the fourth preset number of second-level cluster centers in sequence; and
  calculating distances from the to-be-retrieved data to the pieces of sample data, and returning a fifth preset number of pieces of sample data based on results of the calculating.

19. A non-transitory computer readable storage medium, storing computer instructions that, when executed by a computer, cause the computer to perform operations, the operations comprising:
  acquiring a data set, and dividing the data set into a first data set and a second data set, wherein an amount of data in first data set is less than an amount of data in second data set;
  clustering the data in the first data set, to obtain at least one first-level cluster center;
  clustering the data in the first data set based on the first-level cluster center, to obtain corresponding at least one second-level cluster center;
  obtaining a codebook corresponding to the first data set based on residuals between the data in the first data set and the first-level cluster center and residuals between the data in the first data set and the second-level cluster center; and
  training the second data set based on the codebook corresponding to the first data set, to obtain a codebook corresponding to the data set.

20. The non-transitory computer readable storage medium according to claim 19, wherein the clustering the data in the first data set based on the first-level cluster center to obtain corresponding at least one second-level cluster center comprises:
  for each piece of first data in the first data set, calculating a residual between the each piece of first data and a first-level cluster center closest to the piece of first data, to obtain a first residual vector space corresponding to the first data set; and
  clustering the first residual vector space to obtain the corresponding at least one second-level cluster center.

* * * * *